Oct. 30, 1962 N. D. NEWBY ET AL 3,061,193

MAGNETIC CORE ARITHMETIC UNIT

Filed Oct. 21, 1958 7 Sheets-Sheet 1

INVENTORS: N. D. NEWBY
P. J. STURIALE
BY Alan C. Rose
ATTORNEY

Oct. 30, 1962 N. D. NEWBY ET AL 3,061,193
MAGNETIC CORE ARITHMETIC UNIT
Filed Oct. 21, 1958 7 Sheets-Sheet 2

INVENTORS: N. D. NEWBY
P. J. STURIALE
BY Alan C. Rose
ATTORNEY

INVENTORS N. D. NEWBY
P. J. STURIALE
BY Alan C. Rose
ATTORNEY

Oct. 30, 1962 N. D. NEWBY ET AL 3,061,193

MAGNETIC CORE ARITHMETIC UNIT

Filed Oct. 21, 1958 7 Sheets-Sheet 4

INVENTORS N. D. NEWBY
P. J. STURIALE
BY Alan C. Rose
ATTORNEY

INVENTORS: N. D. NEWBY
P. J. STURIALE
BY Alan C. Rose
ATTORNEY

INVENTORS: N. D. NEWBY
P. J. STURIALE
BY Alan C. Rose
ATTORNEY

INVENTORS N. D. NEWBY
P. J. STURIALE
BY Alan C. Rose
ATTORNEY

United States Patent Office 3,061,193

Patented Oct. 30, 1962

3,061,193
MAGNETIC CORE ARITHMETIC UNIT

Neal D. Newby, Leonia, N.J., and Philip J. Sturiale, Brooklyn, N.Y., assignors to Bell Telephone Laboratories, Incorporated, New York, N.Y., a corporation of New York Filed Oct. 21, 1958, Ser. No. 768,783
16 Claims. (Cl. 235—176)

This invention relates to arithmetic circuits of the magnetic core type for handling binary coded decimal digits.

In the operation of computer circuits, simplicity and accuracy are of paramount importance. Accordingly, one object of the present invention is to simplify core type arithmetic circuits; another object of the invention is to correct errors at a low level in digital data handling circuits before the errors propagate or multiply.

These and other objects are secured in an arithmetic unit in accordance with one illustrative embodiment of the invention by the use of a series of magnetic core matrices, each of which handles a pair of binary coded decimal digits, and in which the magnetic cores have substantially rectangular hysteresis characteristics. A separate matrix is provided for each denominational order; that is, a first matrix handles the two units digits which are to be added or subtracted, a second matrix handles the two tens digits, and so forth. Each matrix may, for example, be provided with two opposed sets of ten input terminals, one set for each decimal input digit. Translators are provided for converting each of the two binary coded decimal input digits into a so-called "one-hot" code in which one of the ten input terminals of each of the opposed sets of terminals is enabled, or selected. Current flowing between the two selected terminals reverses the magnetization of selected cores in the matrix to represent the sum or difference of the input digits. To facilitate "carries" from stage to stage, the matrix in each decimal stage of the arithmetic unit may be provided with a "carry" core arrangement which is physically part of one of the translators associated with the next more significant stage of the computer.

Input signals to the translators and output signals from the matrix in each stage may be on a "two-rail" basis. That is, the signal for each binary digit appears on two leads, with a binary "1" being represented by a pulse on one of the two leads and a binary "0" by a pulse on the other lead. By the use of a parity check bit and "two-rail" signals, erroneous signals on any one lead may be located and corrected.

Correction of certain erroneous signals may be handled in the translators by the use of a parity bit and pairs of cores which are energized on a "two-rail" basis to represent the two different values of each of the binary input digits making up the binary coded decimal input to the translator. Signals from the parity bit input are employed to block half of the output leads from the translator, thereby correcting certain errors which could otherwise produce duplicate output signals.

In accordance with one feature of the invention, an arithmetic unit includes several stages of progressively increasing significance each having a magnetic core matrix and two translators. Furthermore, a carry core structure is provided which forms part of each matrix and also extends into one of the translators in the next stage.

In accordance with another feature of the invention a magnetic core arithmetic matrix is provided with two sets of opposed input leads and windings on the cores interconnecting each lead of one set with each lead of the other set. Translators are also provided for converting binary input signals into "one-hot" signals for application to one and only one of each of said sets of input leads.

In accordance with another feature of the invention, binary signals are presented on "two-rail" circuits, circuits for providing a single parity check digit are included, and error correction circuits are provided which correct erroneous signals on any one lead.

A complete understanding of this invention and of these and various other features thereof may be gained from a consideration of the following detailed description and the accompanying drawing, in which:

FIGS. 1 and 2 are a schematic representation of one specific illustrative embodiment of the invention comprising the translators and the core matrix included in a single stage of an arithmetic unit in accordance with the invention;

FIG. 3 indicates the physical linking of successive stages of the arithmetic unit by "carry" cores;

Figure 1:
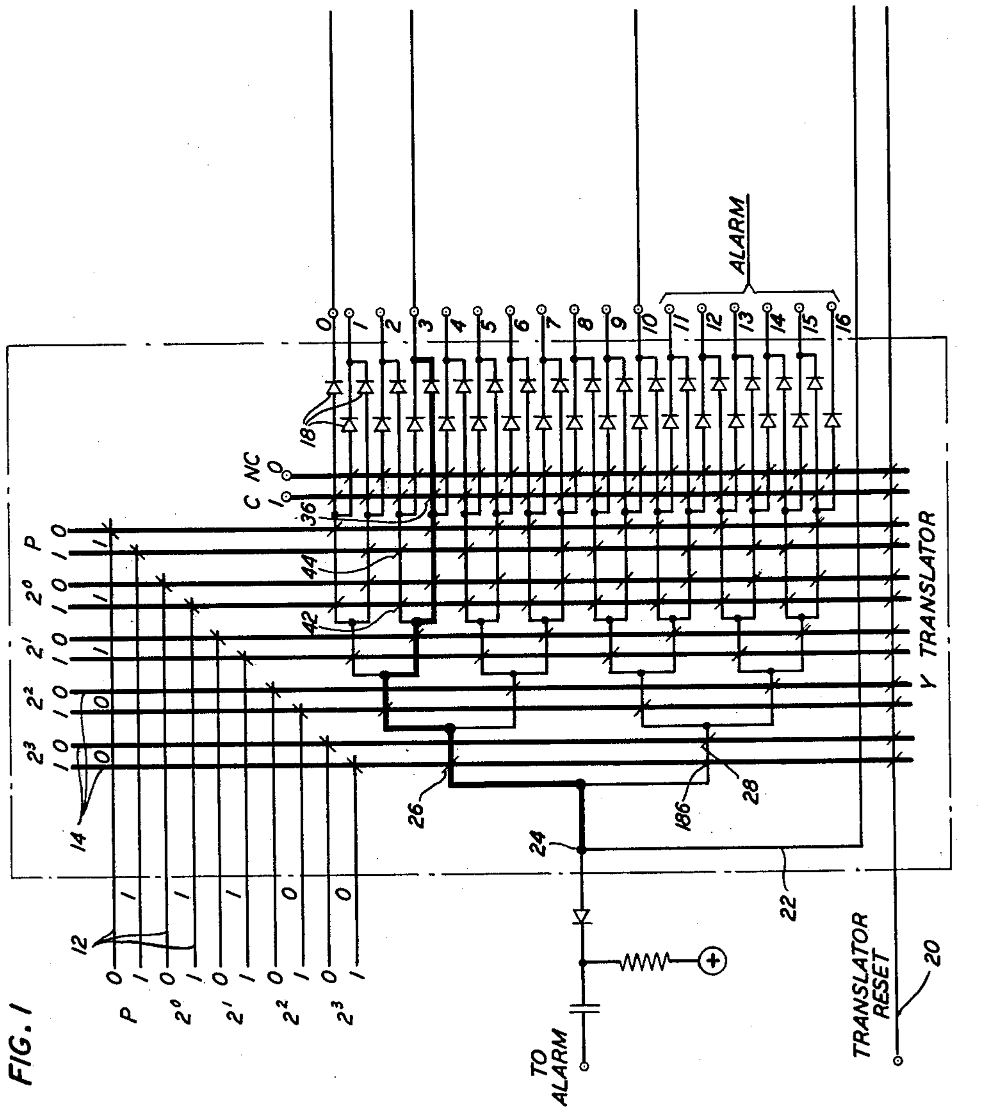
Figure 2:
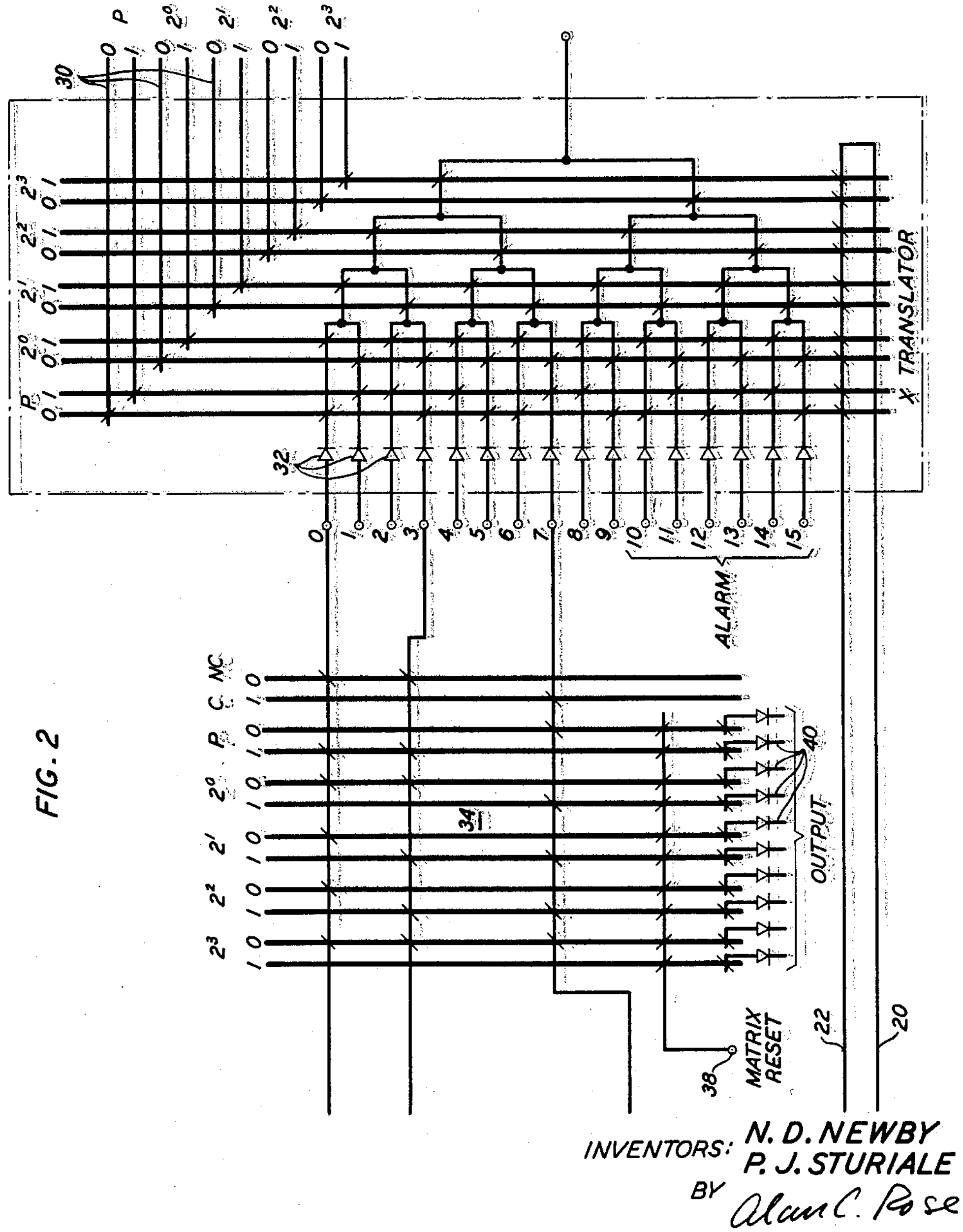

FIGS. 1 and 2 of the drawing, when taken together, form a circuit diagram of two magnetic core translators and a magnetic core adding matrix in accordance with the present invention, the magnetic cores having two stable states of remanence, as is known in the art. In FIG. 1, input signals are applied on leads 12 to set selected magnetic cores 14. The input binary digits are in the so-called "two-rail" form. More specifically, the signals representing each binary digit are applied to a pair of leads. A binary "1" may, for example, be represented by a pulse on one lead and the absence of a pulse on the other lead, and a binary "0" is represented by a pulse on the second lead and the absence of a pulse on the first lead.

The correspondence between the input leads 12 and the cores 14 of the Y translator is indicated by the designations $2^0$ through $2^3$ and the letter P. The four binary input digits have a significance indicated by the designations $2^0$ through $2^3$, and the letter P designates the parity check bit. In the system under consideration, odd parity is employed. Thus, if the original binary number is 0011, for example, representing the decimal number 3, a parity check bit of "1" is added to make the total number of binary digits odd. Odd parity was selected in preference to even parity in the present example in order to have at least one binary "1" present in the five-bit code group, even if the original four-digit code group included all "0's."

Input signals applied to leads 12 therefore establish a corresponding pattern of magnetization in cores 14. Now, the core logic circuit shown in the lower portion of the Y translator in FIG. 1 is patterned after an arrangement disclosed in FIG. 8 of an article entitled "Pulse Switching Circuits Using Magnetic Cores," by M. Karnaugh, pages 570 through 584, of the Proceedings of the I.R.E., May 1955, volume 43, No. 5. In general, the magnetic circuit selects a single one of the output terminals designated 0 through 16 in FIG. 1. In the selection process diodes 18 coupled to the terminals 0 through 16 are all back-biased with the exception of the diode 18 associated with the selected output terminal.

Figure 4:
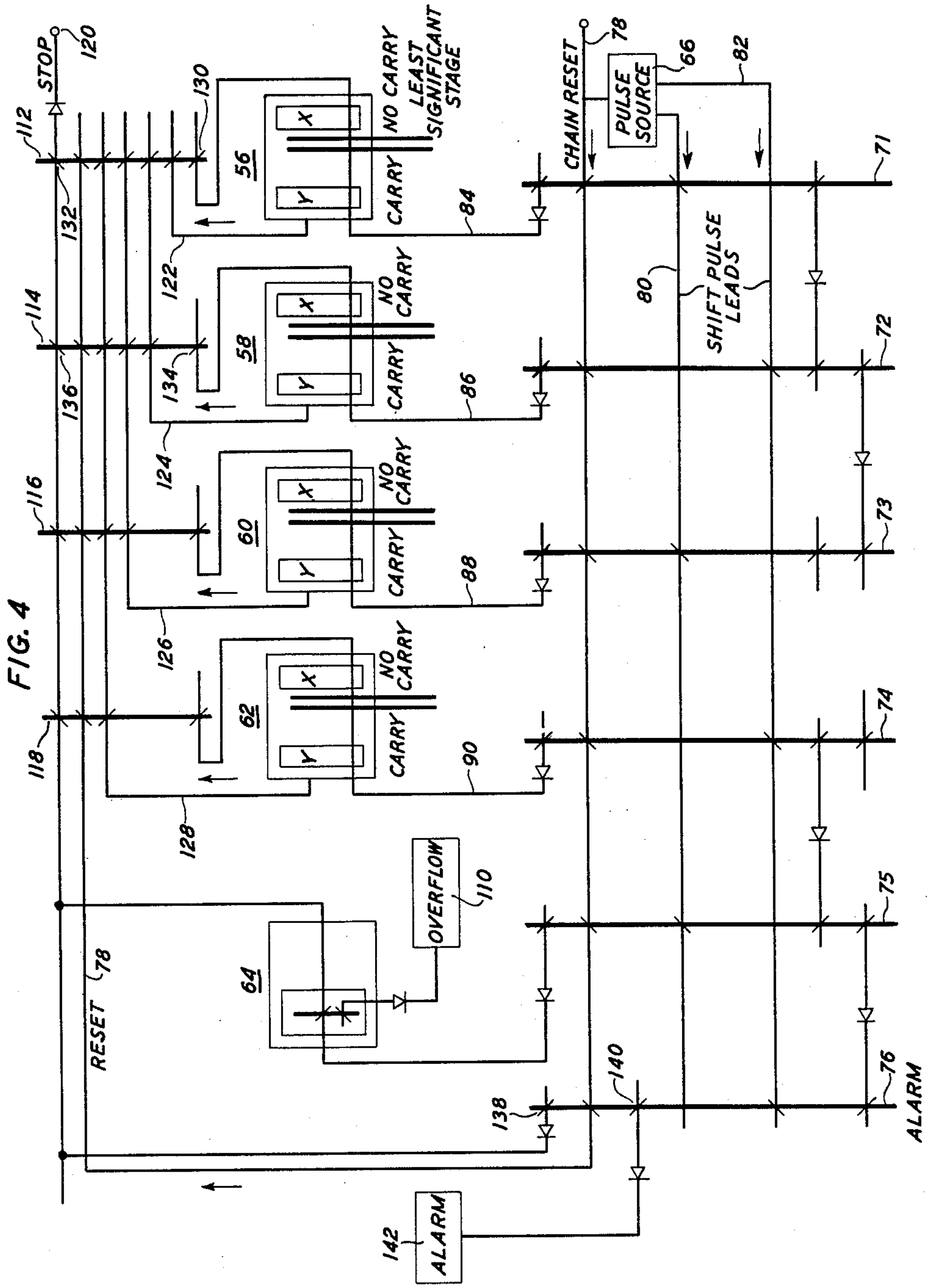
FIG. 4 shows control circuits associated with successive stages of the arithmetic unit.

The schematic representation of magnetic circuits is considerably facilitated by the use of mirror symbols. This type of symbology is clearly described in the afore-cited Karnaugh article and is illustrated in FIG. 4 thereof. This symbology is employed herein in depicting illustrative embodiments of the present invention.

In accordance with that symbology, magnetic cores are represented by heavy vertical line segments, winding leads are represented by horizontal line segments, and windings are represented by 45-degree mirror symbols at the intersections of the vertical cores and the horizontal leads. The sense of the magnetic field associated with a current in a given winding is obtained by "reflecting" the current in the winding mirror symbol. To find the directions of the electromotive forces induced when the applied field switches a core, reverse this field and reflect it in each winding mirror symbol. These conventions are completely consistent with Lenz's law.

The application of a current pulse in a given direction to a first type of core winding, which is wound around a core in one direction and is represented by a 45-degree mirror symbol that extends into the first and third quadrants, causes the core to switch to one magnetic state, while the application of a similarly-directed pulse to a second type of core winding, which is wound around the core in the opposite direction and is represented by a 45-degree mirror symbol that extends into the second and fourth quadrants, causes the core to switch to its other stable magnetic state. In switching from one to the other of its two stable states, a core experiences a magnetic flux reversal which induces a voltage of one polarity in the first type of core winding and a voltage of the opposite polarity in the second type of core winding.

As seen, for example, in FIG. 1 of the drawing herein, various ones of the core windings are connected in circuit paths which include the diodes 18. Thus, when a switching pulse is applied to the cores 14, a given diode 18 will be back-biased or not depending on the types of core windings in circuit therewith and on the states of the cores 14.

To facilitate an understanding of the translator of FIG. 1, a particular code will now be traced through from its binary representation at leads 12 to the selection of the corresponding output terminal 0 through 16. The binary code group applied to leads 12 will be 0011, representing the decimal number 3. In addition, a parity check bit is added to make the complete code group 00111. With this applied input code, the "1" leads associated with digits P, $2^0$ and $2^1$ are energized, and the "0" leads associated with binary digits $2^2$ and $2^3$ are also energized. In FIG. 1, the pattern of energization is indicated by the code group 00111 associated with both the leads 12 and the cores 14.

In the article by M. Karnaugh cited above, a selection circuit of the type shown in FIG. 1 is designated an AB type core circuit. The "A" designation indicates that the current which is employed to reset all of the cores is also employed in the selection circuits through the tree-like selection circuits. As applied to the circuit of FIGS. 1 and 2, resetting signals applied to lead 20 pass through both the Y translator shown in FIG. 1 and the X translator of FIG. 2, and return on lead 22 to be applied to terminal 24 at one of the core selection trees. The "B" part of the designation AB applied to this type of switching circuit indicates that the back voltage developed by cores which are reset *blocks* certain of the possible transmission paths. Thus, considering the two alternative paths from terminal 24 through coils 26 and 28, the coil 28 is on the "0" core associated with digit $2^3$. As this core was initially set by the signals applied on leads 12, the reset signal applied to lead 20 now reverses the magnetization of the core and produces a blocking pulse in coil 28. As the "1" core associated with the $2^3$ digit was not set, no such blocking signal appears in coil 26. The upper path from terminal 24 through coil 26 is therefore selected. The selection process continues as indicated by the heavy line in FIG. 1 defining a selected circuit path from terminal 24 through to output terminal 3, assuming that core NC in the Y translator has been set by arrangements which will be described below. In each case, the energization pattern of the cores 14 determines the selection of the switching path. With a pattern of input signals as assumed above, all of the diodes 18 except the lower diode associated with terminal 3 are back-biased. A low impedance path through the selected diode has now been established. The translator of FIG. 1 has therefore converted the binary input signals into a "one-hot" output signal in which only one of the output terminals 0 through 16 is energized.

In the specific illustrative embodiments of the principles of the present invention which are described herein, binary coded decimal input signals are applied to the input leads 12 of the Y translator of FIG. 1 and are converted into a "one-hot" code by enabling or selecting only one of the output terminals of the Y translator. In such a specific embodiment, all of the output terminals 0 through 16 would not be required. In fact, only eleven of the output terminals would be necessary, ten to respectively represent the decimal digits 0 through 9 and one more to provide for the possibility of a carry signal being coupled to the Y translator. However, in accordance with the principles of this invention, the input signals could also be coded in a manner which would require more than eleven output choices to uniquely represent the possible input combinations and to provide for the possibility of a carry signal. To illustrate this more general applicability of the circuit arrangement of FIG. 1, there are shown therein output terminals marked 11 through 16 which would not be required for the specific case of binary coded decimal input signals and which, if energized for this case, would indicate to an alarm circuit that an error in operation had occurred.

With reference to FIG. 2, the X translator performs much the same function as discussed above in connection with the Y translator of FIG. 1. More specifically, the binary coded signals applied to input leads 30 are converted into a "one-hot" signal at terminals 0 through 15. A selected one of the diodes 32 associated with terminals 0 through 15 is forward-biased, whereas the remaining diodes are back-biased.

The matrix 34 of FIG. 2 includes twelve magnetic cores. Eight of these cores are employed to indicate the four digits $2^0$ through $2^3$ required to represent each binary coded decimal number. In addition, two cores are employed to represent the parity digit, and the states of the remaining pair of cores represent the presence or absence of a carry signal. Each of the output terminals 0 through 10 of the Y translator of FIG. 1 is connected to every one of the terminals 0 through 9 of the X translator; accordingly, in this specific embodiment there are one hundred and ten interconnecting leads. These interconnecting leads are coupled to coils associated with appropriate cores in matrix 34. For convenience, only a few of these cross-connections are shown in FIG. 2. However, the remaining cross-connections are coupled to set those cores required to produce the proper sum of the number signals applied to leads 12 and 30.

The interconnections between the X and Y translators and the matrix of a stage of an illustrative embodiment of this invention, and the particular arrangement of the windings on the cores of the matrix, may be regarded as a wired-in algorithm table. Thus, for example, the matrix 34 of FIG. 2 includes a circuit path comprising a horizontal lead and a number of core windings which interconnects output terminal 3 of the Y translator of FIG. 1 to output terminal 3 of the X translator of FIG. 2. As shown in FIG. 2, this circuit path is arranged to provide a wired-in answer to the problem of 3+3. More specifically, the path includes a winding on the "0" core associated with digit place $2^3$, a winding on the "1" core associated with digit place $2^2$, a winding on the "1" core associated with digit place $2^1$, a winding on the "0" core associated with digit place $2^0$, and a winding on the "1" core associated with the parity digit place. Hence, a current pulse through this circuit path will set the cores which include windings thereon. These cores, it is noted, are representative of the word 0110, that is, the decimal digit 6, and also include a parity "1" digit to maintain the desired odd parity relationship.

In a similar manner, output terminal 3 of the Y translator of FIG. 1 would be connected to each of the output terminals of the X translator of FIG. 2 by a plurality of circuit paths each comprising matrix core windings. These paths are simply prearranged to provide a wired-in answer to any desired algorithm for any combination of a signal appearing at the output terminal 3 of FIG. 1 with a signal appearing at one of the output terminals of the X translator of FIG. 2.

The pair of cores designated C and NC are the two carry cores of the matrix 34. A pair of cores bearing the same designations C and NC are also included in the Y translator of FIG. 1. In point of fact, the carry and no-carry cores associated with each matrix 34 are part of the Y translator of the next more significant stage of the arithmetic unit and may physically be the same. If a carry is present, the C core in the Y translator is energized, and the next higher output terminal is selected. Thus, for example, with reference to FIG. 1, if the C core were energized, a back voltage would be produced by coil 36, and output terminal 4 would be selected instead of output terminal 3.

In the specific example above which involved the addition of 3 and 3, no carry signal would be included in the answer thereto. Accordingly, the wired-in circuit path interconnecting the output terminal 3 of the Y translator of FIG. 1 with the output terminal 3 of the X translator of FIG. 2 is arranged to include a winding on the no carry or NC core of the matrix 34.

Signals from the core matrix 34 are read out by the application of a pulse at terminal 38. Upon application of this reset pulse, the cores of the matrix 34 which have been reversed produce output signals on the appropriate leads 40.

The timing relationship among input signals applied to the leads 12 of FIG. 1, input signals applied to the leads 30 of FIG. 2, translator reset signals applied to the lead 20, and matrix reset signals applied to the terminal 38 is as follows: At a first instant of time, input signals are concurrently applied to the leads 12 of FIG. 1 and to the leads 30 of FIG. 2, thereby setting selected ones of the cores 14 in the Y translator and selected ones of the cores in the X translator. At a second instant of time, a reset signal is applied to the lead 20, thereby (1) resetting both the cores 14 in the Y translator and the cores in the X translator, (2) selecting a particular circuit path through the X and Y translators and the matrix 34, and (3) setting selected ones of the cores in the matrix 34. Lastly, at a third instant of time, a matrix reset signal is applied to the terminal 38, thereby providing output signals on the leads 40 in respective accordance with those cores of the matrix 34 which had been set.

One important feature of the present invention involves the correction of errors. Thus, for example, if a pulse is missing either in the application of signals to leads 12, or if one of the binary cores 14 is not set to the proper state, the proper lead 0 through 16 of the Y translator will still be selected. Referring once more to our example in which the code group 00111 is applied to the Y translator, the case in which the "1" core of digit $2^0$ is not energized will be considered. Under these circumstances, coil 42 will not produce a blocking voltage and both of the two branches of the selection circuit may be energized. However, the presence of the parity bit precludes the selection of the incorrect output terminal. Thus, for example, the "1" core associated with the parity bit is energized. A blocking voltage is therefore provided by core 44, thus preventing the energization of output terminal 2 in addition to output terminal 3.

In a core switching circuit as shown in FIG. 1, it is possible to correct for both additional pulses or pulses which are missing. Arrangements for correcting for both types of errors or circuit failures will be disclosed below. It has been determined, however, that a circuit for correcting only one of these types of errors may be constructed much more inexpensively. In view of the additional fact that most circuit failures would produce a missing pulse, the circuit of FIGS. 1 and 2 has been designed to accommodate only this type of error. The presence of additional pulses may be remedied by arrangements which are fully compatible with the present circuitry, as will be described below in connection with FIGS. 7 and 8. However, as described above, both the Y translator and the X translator of FIG. 2 are provided with circuitry within the translator for automatically correcting for the loss of any single pulse.

The circuitry in the X and Y translators of FIGS. 1 and 2 automatically corrects for the loss of any single pulse or for the failure of a selected core to switch and depends for its operation on (1) the assumption that correct parity signals are available at the inputs to the translators and that the selected parity cores switch in the intended manner, and (2) the fact that the parity signals and the states of the parity cores are derived from a group of information signals including the missing signal. Thus, although, as specified in the example above, the "1" core of digit place $2^0$ of the Y translator may fail to switch, the information contained in the pattern of energization of the parity cores is sufficient to compensate for this failure.

In the absence of parity cores, the effect of such a failure is to permit the energization of two output paths. The presence of correctly-switched parity cores, however, serves to select the proper output path and to block the other output path, thereby to provide a correct indication at the output terminals of the translators.

Figure 3:
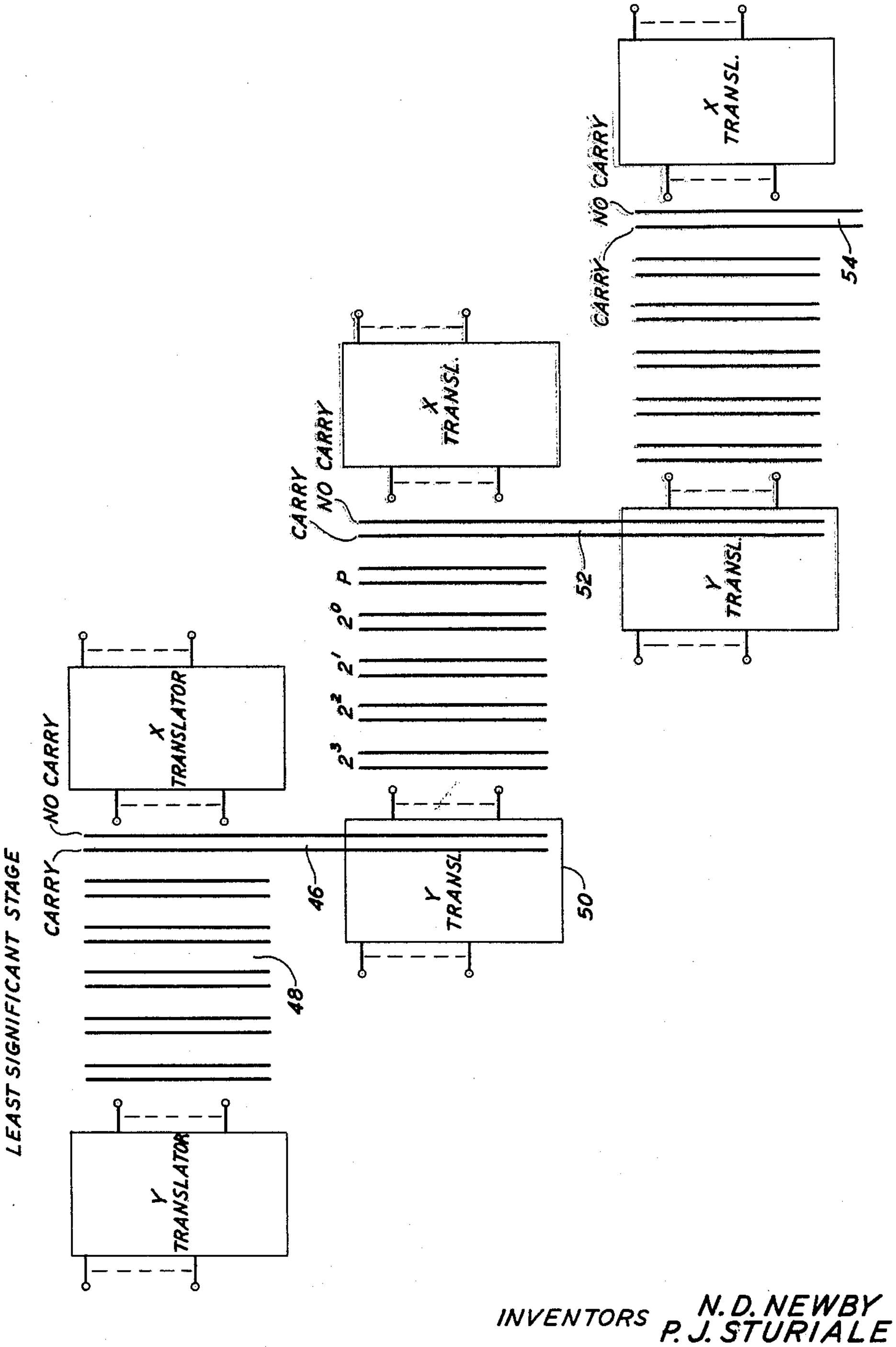

FIG. 3 is a graphic illustration of the sharing of carry cores between the core matrix of one stage and the translator of the next more significant stage. Thus, for example, the carry cores 46 are part of the core matrix 48 of the least significant stage, and also form part of the Y translator circuit 50 in the next more significant stage. In a similar manner, the carry cores 52 and 54 are each part of one core matrix and of the translator of the next more significant stage.

FIG. 4 is a circuit diagram showing the control circuits for the arithmetic unit including circuits as shown in FIGS. 1 through 3. More particularly, the control circuits shown in FIG. 4 control the successive energization of the stages of the arithmetic unit to provide for the propagation of carries from one stage to the next. Furthermore, arrangements are provided for stopping each addition algorithm following the handling of the most significant digit applied to a stage of the arithmetic unit.

In FIG. 4, a series of stages 56, 58, 60, and 62 are indicated. Stage 56 is the least significant stage, and a vestigial stage 64 is indicated beyond the last complete stage 62 which is shown. A conventional core shift register including a pulse source 66 and a series of cores 71 through 76 is employed to apply successive control signals to the stages of the arithmetic unit. A reset signal applied to lead 78 sets all of the cores 72 through 76 to the "0" state, and sets the first core 71 of the shift register to the "1" state. Shift pluses applied on leads 80 and 82 then advance the "1" signal progressively through the magnetic core shift register. Each time the signal is advanced from one core to the next, reset signals are applied to the associated stage of the arithmetic unit. With reference to FIG. 1, the reset lead 20 corresponds to the lead 84 associated with stage 56 of the arithmetic unit. The corresponding reset leads 86, 88, and 90 are associated with stages 58, 60, and 62, respectively, of the arithmetic unit.

The vestigial arithmetic stage 64 in FIG. 4 is coupled to the carry core from the previous arithmetic stage. The circuit 110 provides an overflow indication showing that the arithmetic operation completed in the previous stage has produced a carry into arithmetic stage 64. The overflow register 110 provides an alarm indication unless it is otherwise inhibited through a programming operation.

Illustratively, the core which is included in the vestigial arithmetic stage 64 may physically be a part of the carry core of the most significant digit stage 62. Thus, the production of a carry in the stage 62 causes the carry core thereof, and also the core depicted as being in the stage 64, to switch, thereby to induce a voltage in the lower one of the core windings of the stage 64. This induced voltage is coupled to the overflow circuit 110 which may, for example, comprise a relay coil and associated contacts responsive to the induced voltage for closing a circuit path between an alarm device and an energization circuit.

The cores 112, 114, 116, and 118 are part of a stop circuit which provides an indication at terminal 120 when the arithmetic operation is complete. With reference to the circuit of FIGS. 1 and 2, the "1" lead of each pair of input leads 12 and 30, with the exception of the P leads, is connected to a common return lead (not shown in FIGS. 1 and 2) and applied to set the appropriate cores 112, 114, 116, or 118. Thus, for example, when significant binary coded decimal input signals are applied to either or both translators X and Y of stage 56 in FIG. 4, lead 122 is energized to set core 112 to the "down" state. In this regard, it may be noted that a reset signal previously applied on lead 78 has provided an initial "up" state for all of the cores 112, 114, 116, and 118. In a similar manner, signals are applied to the appropriate leads 124, 126, or 128 to set cores 114, 116, or 118 when either of the input translators is energized with significant decimal digits.

When numbers are to be added which are shorter than the capacity of the arithmetic unit, the stop circuit halts the operation as soon as the most significant digit has been handled and thus avoids wasting time. Thus, for example, when two decimal numbers each including only one digit are to be added, only the first core 112 is set to its "down" state. With no input signals applied to the input translators of more significant stages 58, 60, and 62, leads 124, 126, and 128 are not energized and core 114 remains in the "up" state. Now, when a translator reset signal is applied on lead 84 to stage 56, the coil 130 on core 112 is poled to set the core 112 to the "down" state. As the core 112 is already in the "down" state, however, no output signal is picked up by coil 132 and the stop output terminal 120 is not energized.

A stop signal is, however, produced when the translator reset lead 86 for stage 58 of the arithmetic unit is pulsed. The reset signal stores any possible carry from stage 56 in the output matrix of stage 58. As mentioned above, core 114 is in the "up" state. The translator reset signal applied to coil 134 changes the state of core 114 and produces an output pulse through coil 136 to the stop output terminal 120.

It may also be noted that core 76 has an output coil 138 which is connected to the stop terminal 120. Accordingly, if the cycle of the arithmetic unit has not been halted prior to the switching of core 76, the cycle will be stopped at this time. Core 76 is also provided with a coil 140 which is coupled to an alarm circuit 142. This indicates that the arithmetic operation has proceeded beyond the capacity of the arithmetic unit, and that the results indicated by the individual stages are probably erroneous.

The stop output terminal 120 is coupled to the master control program unit (not shown) of the computer. When a signal is received from terminal 120, the pulse source 66 is disabled and the matrix reset leads of all stages of the arithmetic unit are enabled to read out the computed answer.

Figure 5:
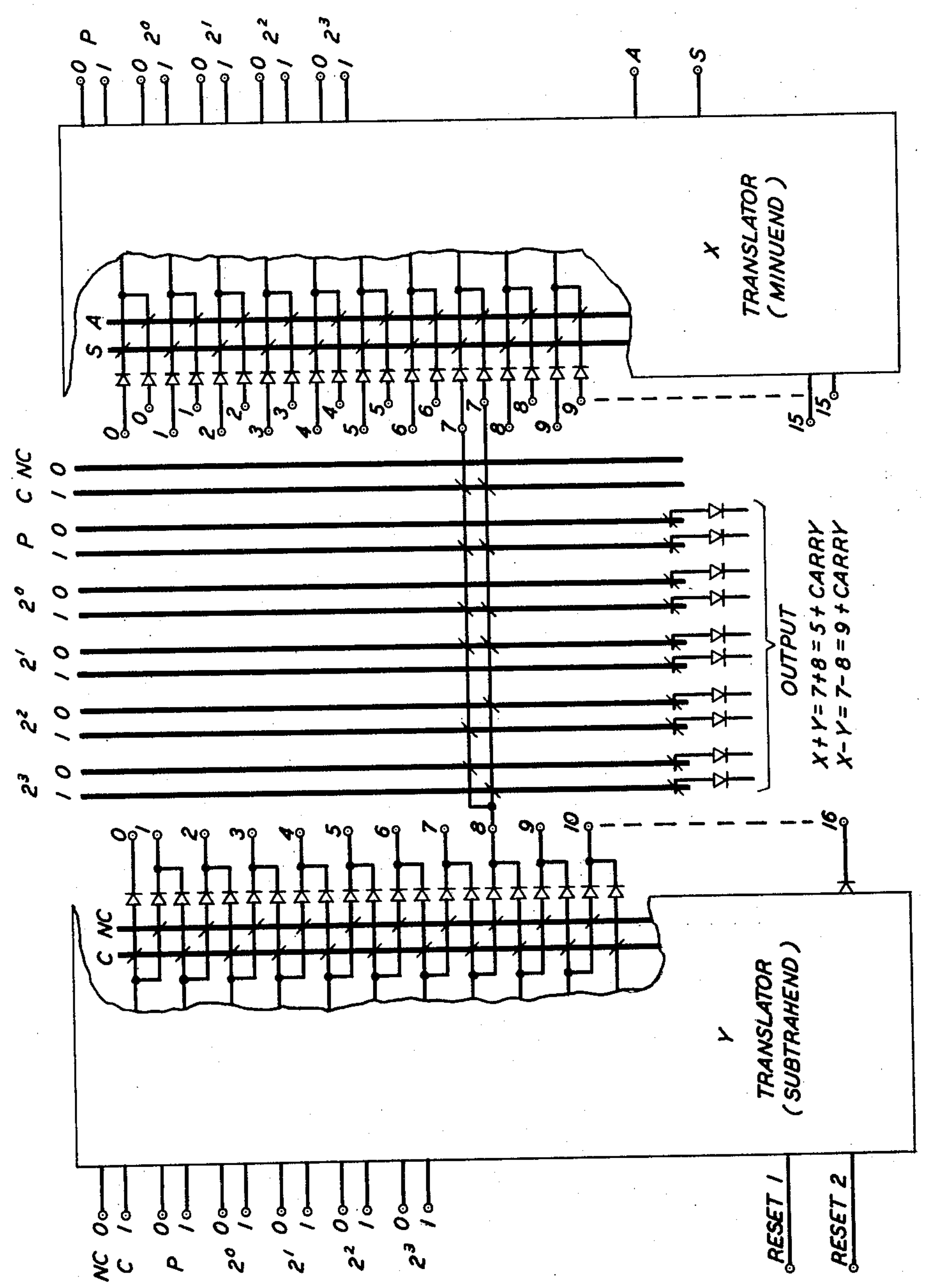
FIG. 5 is a simplified showing of an alternative stage of the arithmetic unit which is arranged to permit both subtraction and addition, in accordance with the invention.

In FIG. 5, an arithmetic unit is shown in which wired-in arrangements for subtraction are provided as well as for addition. In the circuit of FIG. 1, it will be recalled that the carry circuit involved the addition of a "1" to the number applied to the Y translator when the carry core was energized. The same type of circuitry may be utilized for subtraction by utilizing the Y translator for entry of the subtrahend and the X translator for the minuend in subtraction operations. To define terms, it is noted that a *subtrahend* is subtracted from a *minuend* to produce a *difference*. The operation mentioned above, in which the subtrahend is increased by one unit, is one method for handling subtraction "borrows" as an alternative to subtraction of a unit from the next more significant digit of the minuend.

In general, therefore, the X and Y translators shown in FIG. 5 are identical with those shown in FIG. 1. As the final selection operation at the left-hand side of the X translator, however, it is necessary that a selection be made between the subtraction and the addition sets of terminals. Accordingly, the subtraction and addition cores designated S and A in FIG. 5 are provided. Additional logically-arranged prewired cross-connections between the terminals of the X and Y translators are also required, as indicated for the digits 8 and 7 in the example of FIG. 5. In all other respects, the control circuitry and mode of operation for the combined subtraction and addition stage of FIG. 5 are the same as that described above with reference to FIGS. 1 through 4.

Figure 6:
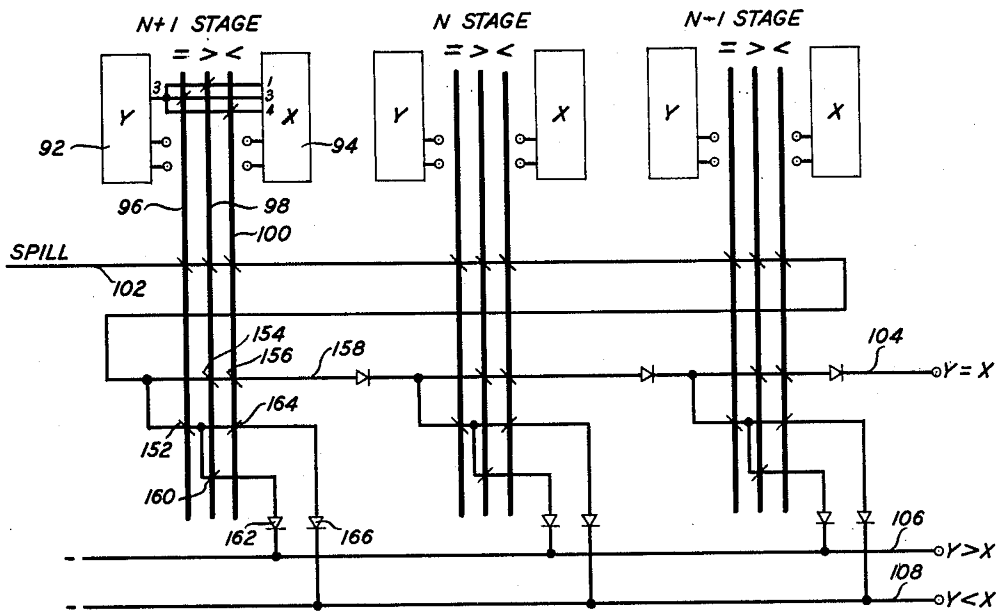
FIG. 6 shows number comparison control circuitry for the arithmetic unit.

In addition to the circuitry shown in FIGS. 1 through 5, the arithmetic unit may include arrangements for comparing two numbers to determine which number is greater than the other or if the two numbers are equal. Circuitry for providing this function, as shown in FIG. 6, requires an additional three cores associated with each stage of the arithmetic unit. A plurality of wired-in connections between output terminals of the Y and X translators pass through coils associated with the three cores as indicated in FIG. 6. Thus, for example, the connection between terminal 3 of Y translator 92 and terminals 1, 3, and 4 of X translator 94 is indicated in the upper left-hand corner of FIG. 6. Core 96 indicates equality between the two digits. Energization of cores 98 or 100 indicates that the number registered in Y translator 92 is greater than or less than that registered in X translator 94. Following the energization of one of the three comparison cores associated with each stage of the arithmetic unit, a reset pulse is applied on lead 102. The resultant output signals on leads 104, 106, or 108 indicate whether the number applied to the Y translators is equal to, greater than, or less than that applied to the X translator 94.

In accordance with the magnetic core switching terminology set forth in the article by Mr. Karnaugh set forth above, the core logic circuitry of FIG. 6 is a combination of AB and AF type switching. The designation AB implies a blocking action. This blocking action occurs in connection with the operation of coils 152, 154, and 156, for example, associated with cores 96, 98, and 100, respectively. When core 96 has been set, indicating that the decimal numbers in the X and Y registers are equal, a signal on the "spill" lead 102 reverses the magnetic state of core 96 and develops a back voltage in coil 152. The states of cores 98 and 100 are unchanged so no back voltage is developed in coils 154 and 156. Accordingly, a signal is transmitted along lead 158 indicating that the most significant digits were equal. A similar action takes place in the remaining less significant stages of the arithmetic unit if each decimal digit applied to the Y translators is equal to the corresponding decimal digit applied to the X translators. Under these circumstances, an output signal proceeds to terminal 104, indicating that number Y is equal to number X.

If the decimal digit Y in register 92 is greater than decimal digit X applied to translator 94, the state of core 98 is reversed. Upon the application of a "spill" signal to lead 102, a back voltage is developed in coil 154 as core 98 is switched back to its original state. Coil 160 is coupled in the opposite sense to core 98, however, and a forward voltage is applied through diode 162 to output lead 106. While the blocking action of coil 154 corresponds to the AB type of switching disclosed in Mr. Karnaugh's article, the forward voltage provided by a coil 160 corresponds to the type of switching designated AF in this article.

In a similar manner, when the decimal number in the Y translator 92 is less than the decimal number applied to the X translator 94, the state of core 100 is reversed. Under these circumstances, a back voltage is developed by coil 156 to block signals from lead 158, and a forward signal developed by core 164 draws the "spill" pulse down through diode 166 to output lead 108. This operation provides an indication that the number Y is less than the number X.

In order to provide an output indication on lead 104, the digits in all stages must be equal. Lead 104 is therefore connected to the three comparison cores in each stage in series. To provide output signals on leads 106 or 108, however, it is desired that a signal be obtained from the first stage, starting with the most significant stage, in which the X and Y digits are not the same. Accordingly, the output leads from successive stages are connected to leads 106 and 108 in parallel.

Only a few of the required wired-in connections between the output terminals of the Y translator 92 and the X translator 94 are shown in FIG. 6. These few connections serve, however, to illustrate the general mode of interconnection therebetween. More specifically, the terminal 3 of the Y translator 92 is connected to each of the X translator output terminals which is numbered higher than 4 by a circuit path identical to the one which interconnects the terminals 3 and 4 of the translators 92 and 94, respectively. Also, the terminal 3 of the Y translator 92 is connected to the output terminal 2 (not shown) of the X translator by a circuit path which is identical to the one which interconnects the terminals 3 and 1 of the translators 92 and 94, respectively. Similarly, each output terminal of the Y translator 92 is connected to every one of the output terminals of the X translator 94. In this manner the windings on and the circuit paths through the cores 95, 98, and 100 represent a wired-in comparison table between the various possible combinations each including one Y output terminal and one X output terminal.

Figure 7:
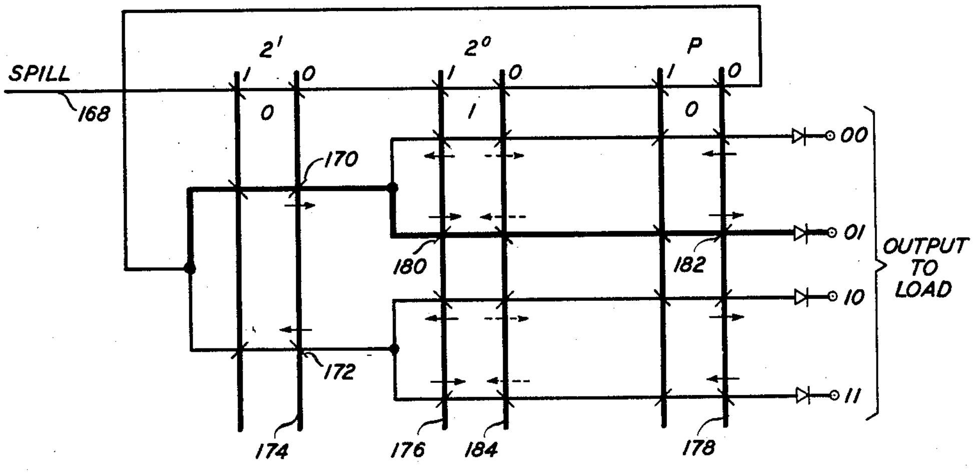
FIG. 7 is an extension of the error correction circuitry employed in the translators of FIGS. 1 and 2.

The circuit of FIG. 7 is similar to the translator circuits set forth in FIGS. 1 and 2. It may be recalled that the translators in FIGS. 1 and 2 were arranged to correct for omissions of a single pulse. In the circuit of FIG. 7, additional windings have been provided so that errors involving either the addition or the omission of a single pulse may be corrected. In FIG. 7, it will be assumed that the cores representing the $2^0$ and the $2^1$ digits have the specific values "1" and "0," respectively. Using odd parity, the "0" parity core will also be energized. Upon the application of a "spill" signal to lead 168, voltages are developed in all of the windings associated with cores which have been set. Thus, for example, a forward voltage is developed in winding 170 and a back voltage is developed in winding 172 on core 174. The forward and reverse voltages developed by the coils associated with cores 176 and 178, which were also set, are indicated by arrows adjacent the individual windings. In order to produce an output signal at one of the four output leads, there must be a net forward voltage developed by the windings which have been energized. With the 010 code shown in FIG. 7, the selected path to the 01 output lead is shown by a bold circuit line. Three forward voltages are provided in this path by the windings 170, 180, and 182 on cores 174, 176, and 178, respectively. It may be noted that a reverse or back voltage appears on the other three output leads as a result of the combination of the other voltage increments as represented by arrows.

With the margins present in the circuit of FIG. 7, the energization of any one additional core or the absence of signals associated with any one of the three cores 174, 176, or 178, for example, would not affect the selection of the proper output lead. Thus, for example, assuming that core 184 were also energized, the net effect would be to reduce the voltage on the selected output lead to two increments and to reduce the back-bias on output leads 00 and 10 to 0. In a similar manner, the elimination of the signals derived from core 176 would have the effect of reducing the margins in precisely the same manner. More generally, in the circuit of FIG. 7, with an error in the energization of a single core, a margin of at least two increments of forward voltage is always present between the selected output lead and any other lead. In addition, unselected leads may have voltages approaching zero potential, but no unselected output paths have a forward bias.

The principles of correcting for either an additional core which is energized or the absence of energization of a core as described in connection with FIG. 7 are clearly applicable to the circuit of FIGS. 1 and 2. To apply the principles to the Y translator circuit in FIG. 1, for example, it would be necessary to provide approximately twice as many coils for the cores 14. Thus, for example, the "1" core associated with digit $2^3$ would have a coil at point 186 in addition to the coil 26. With these additional coils, proper selection could be made despite errors in which both cores representing a single input digit are either energized or de-energized.

As discussed above, the translators in the circuit of FIGS. 1 and 2 provide correct output signals despite the absence of a desired signal applied to one of the magnetic cores. In connection with the description of FIG. 7, techniques were described for correcting single errors involving either an additional input signal or the absence of an input signal.

Figure 8:
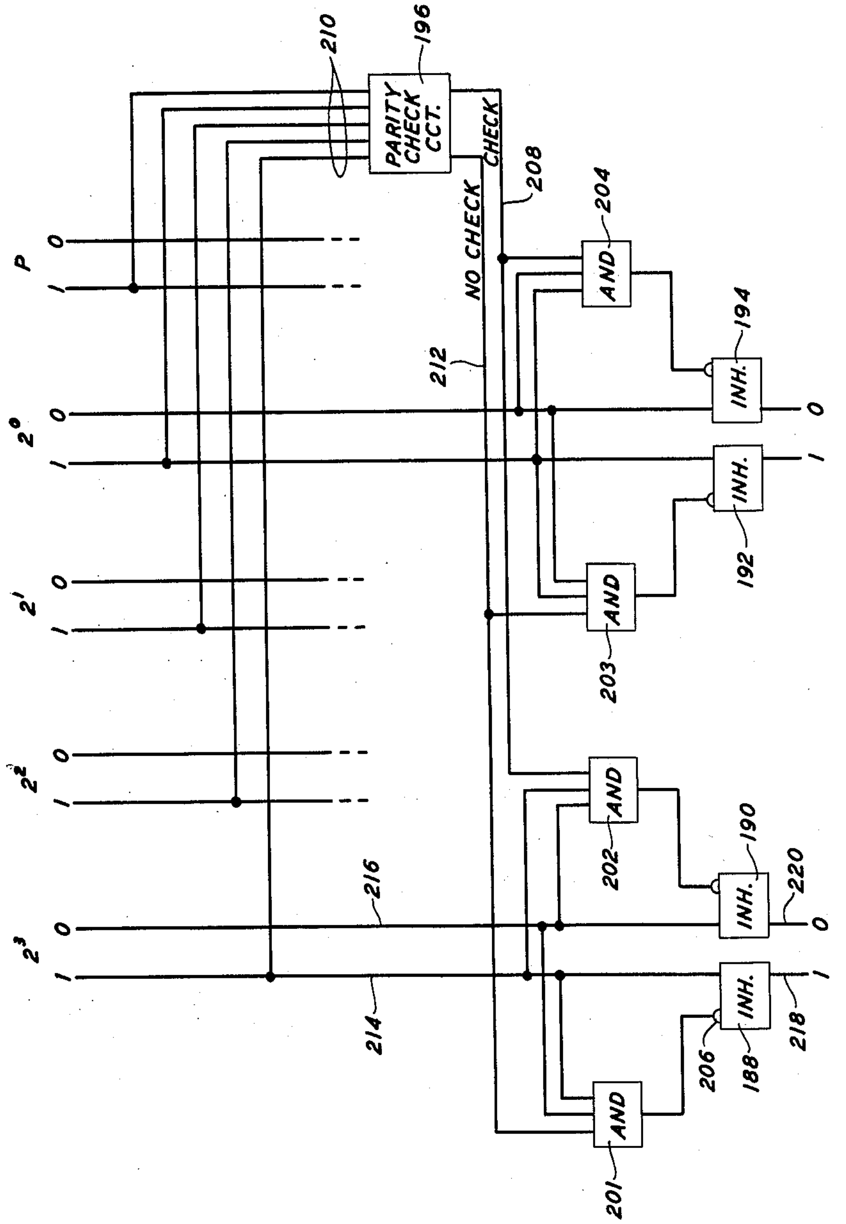
FIG. 8 is a logic circuit diagram of an error correction circuit which may be employed in conjunction with FIG. 2, for example.

In the following description of FIG. 8, another circuit will be described which is compatible with the circuit of FIGS. 1 and 2 and which provides correction for errors in which one extra core is energized. The circuit of FIG. 8 is designed for coupling to the output leads 40 from the core matrix 34 of FIG. 2. It may be noted that the four binary digits and the parity bit are provided in the so-called "two-rail" type of logic representation. Accordingly, only one of each pair of leads should be energized. The circuit of FIG. 8 provides an arrangement for inhibiting the undesired signal in cases where both of the two leads of any pair are energized. Each of the ten input leads is provided with an inhibit unit which is employed to block the transmission of undesired extra pulses. Thus, the inhibit units 188 and 190 are associated with the two leads representing the $2^3$ digit and the inhibit units 192 and 194 are associated with the leads representing the $2^0$ digits. In a similar manner, the remaining six leads also have inhibit units (not shown) connected in the manner shown for the leads representing $2^0$ and $2^3$ digits. A parity check circuit 196 and AND circuits 201 through 204 are employed to determine the energization of the appropriate inhibit units when correction is necessary.

At this point, it may be useful to define the nature of AND circuits, inhibit units, and parity check circuits. An AND circuit, as its name implies, requires the energization of all input leads in order to produce an output signal. An inhibit unit has one or more normal input leads and an inhibiting input lead. The inhibiting input lead is marked by a small semicircle at the point where the lead is connected to the inhibit block. Thus, for example, the output from the AND unit 201 is connected to the inhibiting input terminal 206 of the inhibit unit 188. When a signal is applied to the inhibiting input terminal of an inhibit unit, the normal transmission of signals through the inhibit unit is blocked. A parity check circuit is a simple logic circuit which determines the validity of the original parity relationship established between the digits of the code group and the parity digit. In the present case, it may be recalled that odd parity is employed. Considering possible modes of instrumentation of the parity check circuit, it could, for example, include a summing circuit, a level quantization circuit, and an output flip-flop. The odd quantization level outputs would then be coupled to set the flip-flop to one state, and the even level outputs to set it to the other state. In all events, the logic circuit 196 is arranged to produce an output signal on lead 208 when an odd number of the input leads 210 is energized and provides an output signal on lead 212 when an even number of input signals is present on leads 210.

Alternatively, it is noted that the parity check circuit 196 may be implemented in the specific manner described in "Error Detection and Correction in Binary Parallel Digital Computers," by J. E. Roberts, August 1, 1952, Electronic Digital Computer Report No. 37, University of Illinois.

For the purposes of the present example, it will be assumed that output signals from the core matrix 34 appear on both leads 214 and 216, which are intended to represent the $2^3$ digit on a "two-rail" basis. The presence of signals on both leads 214 and 216 enables two of the three input leads of both the AND circuit 201 and the AND circuit 202. In view of the connections from the parity check circuit to the "1" leads representing each digit, a check output signal from the parity check circuit 196 indicates that the signal on lead 216 is in error and should be inhibited. Accordingly, the check output lead 208 from the parity check circuit 196 is connected to the third input lead of the AND circuit 202. This action energizes AND circuit 202 and supplies an inhibiting input signal to the inhibit unit 190. The output signal from the inhibit unit 190 is therefore eliminated and the signal on output leads 218 and 220 is in the correct "two-rail" form.

In other words, referring again to FIG. 8, for the odd parity relationship assumed herein and for the case where no extra one of the "1" leads of the $2^3$, $2^2$, $2^1$, $2^0$, and parity digit places is energized, the parity check circuit 196 has coupled thereto on the leads 210 an odd number of signals, thereby to provide a signal on the check output lead 208. This signal on the lead 208 is applied to each of the AND circuits 202 and 204 and also to each of the AND circuits (not shown) respectively associated with the "0" leads of the $2^2$, $2^1$, and parity digit places. Accordingly, as specified above, the presence of signals on both of the leads 214 and 216 (the signal on the lead 216 being a spurious one) provides a signal at the output of the AND circuit 202 to inhibit the spurious signal on the lead 216 from appearing on the output lead 220 of the inhibit circuit 190. Thus, it is seen that the circuit 196 is operative to detect an erroneous signal on the lead 216 even though the parity check circuit 196 is not directly connected thereto. This is, of course, entirely reasonable when it is considered that the output signal of the circuit 196 is derived from the "1" signals which appear in the various digit places and that this output signal, which normally appears on the lead 208 thereby to indicate that no error in the "1" leads of the various digit places has occurred, primes the AND circuits associated with the "0" leads of the various digit places so that, for example, a spurious signal on one of the "0" leads is passed through the AND circuit associated with the one "0" lead to the inhibit input terminal of the inhibit circuit associated with the one "0" lead.

In the preceding paragraphs, the correction of an error in the $2^3$ digit has been described. In a similar manner, errors on the other four pairs of leads are readily corrected.

Additionally, the circuit of FIG. 8 is capable of correcting for an erroneous signal appearing on one of the "1" leads thereof, say, for example, on the lead 214. More specifically, assume that the desired pattern of signals in the $2^3$, $2^2$, $2^1$, $2^0$, and parity digit places is intended to be "0," "1," "0," "1," and "1," respectively, and that a spurious signal is present on the lead 214. There would, under this assumed condition, be four rather than three signals applied to the parity check circuit 196. As a result, there would appear on the output lead 212 of the circuit 196 a signal which, in combination with the desired signal on the lead 216 and the undesired one on the lead 214, would provide a signal at the output of the AND circuit 201. This output signal would appear at the inhibit input terminal of the inhibit circuit 188, thereby blocking the spurious signal from the lead 218.

It may be noted in passing that the error correction circuit of FIG. 8 is quite similar in many respects to that of FIG. 7, and to that forming part of FIG. 1. Thus, for example, in FIG. 8 the presence of errors in a given pair of channels enables the associated AND gates and brings the parity check circuit into play to select the proper output channel. In a similar manner, with respect to FIG. 1, the presence of an error, such as the absence of an energized core, permits the energization of two output paths; that is, two output paths would be energized in the absence of signals applied to the parity cores. The presence of the parity core signals serves to select the proper output lead and block the erroneous output signal in much the same manner that the output signal from the parity check circuit 196 in FIG. 8 accomplishes the same function.

Concerning the core switching circuits, it may be recalled that the translators of FIGS. 1 and 2 operate in accordance with type AB core switching circuitry as described in the article by M. Karnaugh cited above. The switching circuits of FIG. 6, however, operate in accordance with a combination of AB and AF type core circuitry. In each case, the particular circuits may be transformed into other related switching circuits in accordance with the precepts set forth in the Karnaugh article.

It is to be understood that the above-described arrangements are illustrative of the application of the principles of the invention. Numerous other arrangements may be devised by those skilled in the art without departing from the spirit and scope of the invention.

What is claimed is:

1. In an arithmetic unit for binary coded decimal numbers, a plurality of stages for decimal numbers of progressively increasing significance; first and second translation matrices associated with each of said stages, said translation matrices each including a plurality of input leads and a plurality of branching control leads; said translation matrices each having means including two magnetic cores for representing each binary coded input digit and a single parity input digit and windings coupled to said cores and connected to said leads for enabling a unidirectional path only through a single one of said control leads in response to the application of binary signals on said input leads; an output matrix including a plurality of output cores associated with each of said stages; means for energizing said output cores to represent binary signals in accordance with the enabled leads in said two translation matrices; said last-mentioned means including leads coupled to said output cores and electrically interconnecting each control lead of one of said translation matrices with each control lead of the other translation matrix; and carry signal means including at least one magnetic core forming part of each output matrix and one translation matrix associated with the next more significant stage of said arithmetic unit, each of said magnetic cores having a substantially rectangular hysteresis characteristic.

2. In an arithmetic unit for binary coded decimal numbers, a plurality of stages for decimal numbers of progressively increasing significance; first and second translation matrices associated with each of said stages, said translation matrices each including a plurality of input leads and a plurality of control leads; said translation matrices each having means including magnetic cores and windings coupled to said cores and connected to said leads for enabling a unidirectional path only through a single one of said control leads in response to the application of binary signals on said input leads; an output matrix including a plurality of output cores associated with each of said stages; means for energizing said output cores to represent binary signals in accordance with the enabled leads in said two translation matrices; said last-mentioned means including leads coupled to said output cores and electrically interconnecting each control lead of one of said translation matrices with each control lead of the other translation matrix; and carry signal means including at least one magnetic core forming part of each output matrix and one translation matrix associated with the next more significant stage of said arithmetic unit.

3. In combination, a plurality of pairs of electrical channels, means for representing each digit of a group of binary signal digits and a parity digit by a signal on one of a pair of channels and the absence of a signal on the other channel, and means responsive to said parity digit representation for correcting erroneous signals on one of said channels.

4. In combination, means for representing a group of binary digits in two-rail logic form, at least two electrical channels, means for providing a single parity digit for said group of digits in two-rail logic form, each of said digits being represented by a signal on one of said channels and the absence of a signal on another channel, means responsive to said digit representations for correcting errors in the form of extra signals appearing in one of said channels, and additional means for correcting errors in the form of binary signals missing from one of said channels.

5. In combination, means for representing a group of binary digits in two-rail logic form, at least two electrical channels, means for providing a single parity digit for said group of digits, each of said digits being represented by a signal on one of said channels and the absence of a signal on another channel, and means responsive to said digit representations for correcting errors in the form of binary signals missing from one of said channels.

6. In an arithmetic unit for binary coded decimal numbers, a plurality of arithmetic core matrices, one for each decimal stage of the unit, and a pair of core translators associated with each of said matrices for converting binary coded decimal input signals into matrix input signals, at least one carry core associated with each matrix extending into one of the translators associated with the next more significant stage of the arithmetic unit, each of said cores having a substantially rectangular hysteresis characteristic.

7. In combination, a plurality of pairs of electrical channels, means for representing each digit of a group of binary signal digits and a parity digit by a signal on one of a pair of channels and the absence of a signal on the other channel, and means responsive to said parity digit representations for blocking erroneous signals derived from one of said channels.

8. In combination, a plurality of pairs of electrical channels, means for representing each digit of a group of binary signal digits and a parity digit by a signal on one of a pair of channels and the absence of a signal on the other channel, means responsive to said digit representations for correcting erroneous signals on one of said channels, and means responsive to like signals on any of said pairs of channels for enabling a correction circuit, said correction circuit including means responsive to said parity digit representation for blocking erroneous signals derived from the pair of channels having like signals.

9. In an arithmetic unit for binary coded decimal numbers, a plurality of arithmetic core matrices, one for each decimal stage of the unit, and a pair of core translators associated with each of said matrices for converting binary coded decimal input signals into matrix input signals, at least one carry core associated with each matrix having a plurality of coils connected into one of the translators associated with the next more significant stage of the arithmetic unit.

10. In an arithmetic unit for coded decimal numbers, a plurality of arithmetic core matrices, one for each decimal stage of the unit, and a pair of core translators associated with each of said matrices for converting coded decimal input signals into matrix input signals at least one carry core associated with each matrix being directly coupled into one of the translators associated with the next more significant stage of the arithmetic unit.

11. An arithmetic unit for binary coded numbers comprising a plurality of arithmetic core matrices, one for each stage of the unit, a pair of core translators for each of said matrices for converting binary coded input signals to said translators into matrix input signals, each of said translators including a plurality of bistate magnetic cores having output windings thereon, a plurality of output terminals, and means connecting said output windings to said terminals in a branching array, and continuous lead means electrically connecting each of said output terminals of one of a pair of translators to each of said output windings of the other of said pair of translators, said connecting means including input windings of the associated arithmetic matrix cores.

12. An arithmetic unit in accordance with claim 11 wherein each of said arithmetic core matrices includes a pair of carry cores, said carry cores of each matrix being effectively cores of one of the core translators of the next more significant stage of the arithmetic unit.

13. An arithmetic unit in accordance with claim 12 wherein at least one of each pair of core translators includes a pair of parity check cores having output windings thereon connected in said branching array for blocking multiple signals at said core translator output terminals.

14. An arithmetic unit in accordance with claim 12 wherein one of said core translators includes a pair of output terminals for each output of the translator and a pair of magnetic cores for selecting one output terminal of the pair in accordance with the arithmetic function to be performed by the arithmetic unit.

15. A magnetic core translator comprising a plurality of pairs of magnetic cores arranged in successive stages in an array, each of said cores having a plurality of windings thereon, lead means connecting said windings in a branching configuration, each winding on each core being oppositely wound to the winding of the adjacent branch of said lead means configuration on the same core and being also oppositely wound to the winding of the same branch of said lead means configuration on the other core of said pair in each of said stages, and means for switching the state of remanence of said cores, each of said cores having two stable states of remanence.

16. In combination, a plurality of pairs of electrical channels, means for representing each digit of a group of binary signal digits and a parity digit by a signal on one of a pair of channels and the absence of a signal on the other channel, means responsive to said digit representations for correcting erroneous signals on one of said channels, and means responsive to like signals on any of said pairs of channels for enabling a correction circuit, said correction circuit including means responsive to said parity digit representation for changing the signals on one of the pair of channels having like signals.

References Cited in the file of this patent

UNITED STATES PATENTS

| | | |
|---|---|---|
| 2,552,629 | Hamming et al. | May 15, 1951 |
| 2,694,801 | Bachelet | Nov. 16, 1954 |
| 2,808,984 | Marshall et al. | Oct. 8, 1957 |
| 2,826,359 | Deerhake et al. | Mar. 11, 1958 |
| 2,833,468 | Dickinson | May 6, 1958 |
| 2,906,458 | Svobada | Sept. 29, 1959 |
| 2,973,506 | Newby | Feb. 28, 1961 |
| 3,001,710 | Haynes | Sept. 26, 1961 |
| 3,011,165 | Angel et al. | Nov. 28, 1961 |